(12) United States Patent
Bender et al.

(10) Patent No.: US 11,170,032 B2
(45) Date of Patent: Nov. 9, 2021

(54) METHOD AND APPARATUS FOR DETERMINING RESPONSES TO DIGITAL INQUIRY RELATED QUESTIONS

(71) Applicant: Walmart Apollo, LLC, Bentonville, AR (US)

(72) Inventors: Christopher Bender, Berkeley, CA (US); Vivek Kaul, Mountain View, CA (US); Shankara Bhargava Subramanya, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 180 days.

(21) Appl. No.: 16/585,174

(22) Filed: Sep. 27, 2019

(65) Prior Publication Data

US 2020/0110768 A1 Apr. 9, 2020

Related U.S. Application Data

(60) Provisional application No. 62/740,913, filed on Oct. 3, 2018.

(51) Int. Cl.
*G06F 16/332* (2019.01)
*G06F 16/33* (2019.01)
*G06N 3/08* (2006.01)
*G06N 3/04* (2006.01)

(52) U.S. Cl.
CPC ...... *G06F 16/3329* (2019.01); *G06F 16/3332* (2019.01); *G06F 16/3347* (2019.01); *G06N 3/0445* (2013.01); *G06N 3/088* (2013.01)

(58) Field of Classification Search
CPC ............. G06F 16/3329; G06F 16/3332; G06F 16/3347
USPC ......................................................... 707/760
See application file for complete search history.

(56) References Cited

U.S. PATENT DOCUMENTS

| 10,360,265 | B1 * | 7/2019 | Agarwal ........... G06F 16/90332 |
| 10,489,393 | B1 * | 11/2019 | Mittal ................... G06F 16/243 |
| 2018/0052913 | A1 * | 2/2018 | Gaskill ..................... G06N 5/02 |
| 2019/0188319 | A1 * | 6/2019 | Anerousis ............. G06F 16/313 |

* cited by examiner

*Primary Examiner* — Kimberly L Wilson
(74) *Attorney, Agent, or Firm* — Duane Morris LLP; Manita Rawat (57) ABSTRACT

An e-commerce voice response determination system is provided and generally includes a server and a customer computing device. The server may determine, based on a user query, a plurality of product descriptions. The server may determine a similarity value between the user query and each of the product descriptions based on the similarity between each word of the user query and each word of the product descriptions. The server may determine the product description with the most similarity to the user query, and provide a response to the customer computing device based on that product description. In some embodiments, the server may determine whether the user query matches a predefined query. If the user query matches the predefined query, the server provides a response to the customer computing device based on a predefined response to the predefined query.

20 Claims, 8 Drawing Sheets

Frequently Asked Questions

- What payment methods do you accept?
- Do you accept coupons?
- How do I place an order?
- What if I miss my pickup window?
- What is your cancellation policy?
- How does grocery pick up work?

FIG. 8

METHOD AND APPARATUS FOR DETERMINING RESPONSES TO DIGITAL INQUIRY RELATED QUESTIONS

CROSS-REFERENCE TO RELATED APPLICATIONS

This application claims priority to U.S. Provisional Application No. 62/740,913, entitled "METHOD AND APPARATUS FOR DETERMINING RESPONSES TO DIGITAL INQUIRY RELATED QUESTIONS," filed on Oct. 3, 2018, the disclosure of which is incorporated herein by reference in its entirety. Additionally, this application is related to U.S. Provisional Patent Application No. 62/740,909, filed on Oct. 3, 2018, and U.S. patent application Ser. No. 16/585,235, filed on Sep. 27, 2019, each of which is herein incorporated by reference.

TECHNICAL FIELD

The disclosure relates generally to e-commerce and, more specifically, to determining and electronically representing answers to e-commerce related questions.

BACKGROUND

At least some known voice assistant devices, such as digital assistants, allow customers to verbally communicate with the device to perform commercial transactions with online retailers. For example, some voice assistant devices are operable to receive a verbal query from a customer, interpret the verbal query as a purchase order for an online retailer, and electronically submit the purchase order to the online retailer over a network. To successfully act in accordance with the customer's query, however, the voice assistant device must first understand the customer query. To do so, current voice assistant devices may attempt to identify the intent of the customer (e.g., such as the intent to add a product to on online shopping cart), and the entity on which the intent is to be performed (e.g., such as the product that the customer would like added to the online shopping cart). These voice assistant devices, however, have various limitations. For example, they may not properly interpret and respond to questions related to the commercial transaction. Some of these questions may include those that do not include an entity, such as in "How do I place an order?" Other questions that current voice assistants may not properly interpret and respond to include questions with complex or varied syntax, such as in "Can I just hand cash to the employee when I get there?" In addition, current voice assistants may not be operable to respond to questions that require knowledge lookup, such as in the question "How much vitamin C does the product have?"

SUMMARY

The embodiments described herein allow for the determination of responses to e-commerce related queries, such as those that may require information from outside sources, such as product knowledge bases, to answer. The embodiments may include determining whether a query requires outside information. The embodiments may include providing data representing a verbal query to an intent model to determine a label for the verbal query. Based on the determined label, one or more key and corresponding key values associated with the label may be determined. Additionally, a closest matching key may be determined based on the keys and the data representing the verbal query. The closest matching key may then be used to generate a response to the verbal query.

The embodiments described herein may be implemented in any suitable hardware or hardware and software, such as in any suitable computing device. For example, in some embodiments, an e-commerce system is provided that includes one or more computing devices and a database. In some embodiments, a method by one or more computing devices that includes one or more of the functions described herein is provided. In some embodiments, a non-transitory, computer-readable storage medium is provided that includes executable instructions that, when executed by one or more processors, cause the one or more processors to carry out one or more of the functions described herein.

In some embodiments, a computing device configured to receive a user query, and determine, based on the user query, a plurality of keys and corresponding key values. The computing device may then determine a word similarity value between each word of the user query and each word of the plurality of keys. The computing device may also determine a user query similarity value for each of the plurality of keys based on the similarity values between each word of the user query and the corresponding words of each of the plurality of keys. Further, the computing device may determine a matching key based on the user similarity value that corresponds to the most similarity. The computing device may also provide a response to the user query based on the matching key and its corresponding key value.

In some embodiments, a computing device configured to receive a user query. The computing device may determine a first word vector based on the user query, and determine a second word vector based on a predefined query. The computing device may then determine a featurization vector based on at least one feature of the user query and the predefined query. The computing device may concatenate the first word vector, the second word vector, and the featurization vector to generate a concatenation vector. The computing device may determine a vector value based on the concatenated vector. The computing device may then determine whether the user query matches the predefined query based on the vector value.

In some embodiments, a computing device configured to receive a user query identifying a plurality of words. The computing device may determine, based on the user query, a plurality of keys. The computing device may further determine a first similarity value between at least a portion of the plurality of words and each of the plurality of keys. The computing device may also determine a second similarity value for each of the plurality of keys based on the first similarity values corresponding to each of the plurality of keys. Further, the computing device may determine a first key of the plurality of keys that corresponds to the second similarity value indicating a most similarity. The computing device may then generate a response to the user query, wherein the response identifies the first key.

In some examples, the computing device may determine whether the user query matches a predefined query. Further, if the user query matches the predefined query, the computing device may generate the response identifying a predefined response to the predefined query.

In some embodiments, a method, such as by one or more computing devices, includes receiving a user query, and determining, based on the user query, a plurality of keys and corresponding key values. The method may include determining a word similarity value between each word of the user query and each word of the plurality of keys. The method may also include determining a user query similarity value for each of the plurality of keys based on the similarity values between each word of the user query and the corresponding words of each of the plurality of keys. Further, the method may include determining a matching key based on the user similarity value that corresponds to the most similarity. The method may also include providing a response to the user query based on the matching key and its corresponding key value.

In some embodiments, a method, such as by one or more computing devices, includes receiving a user query. The method may include determining a first word vector based on the user query, and determine a second word vector based on a predefined query. The method may also include determining a featurization vector based on at least one feature of the user query and the predefined query. The method may further include concatenating the first word vector, the second word vector, and the featurization vector to generate a concatenation vector. The method may also include determining a vector value based on the concatenated vector. The method may further include determining whether the user query matches the predefined query based on the vector value.

In some embodiments, a method, such as by one or more computing devices, includes receiving a user query identifying a plurality of words. The method may include determining, based on the user query, a plurality of keys. The method may also include determining a first similarity value between at least a portion of the plurality of words and each of the plurality of keys. The method may also include determining a second similarity value for each of the plurality of keys based on the first similarity values corresponding to each of the plurality of keys. Further, the method may include determining a first key of the plurality of keys that corresponds to the second similarity value indicating a most similarity. The method may also include generating a response to the user query, wherein the response identifies the first key.

In some embodiments, a method, such as by one or more computing devices, includes determining whether the user query matches a predefined query. Further, if the user query matches the predefined query, the method may include generating the response identifying a predefined response to the predefined query.

In some embodiments, a non-transitory computer readable medium has instructions stored thereon, where the instructions, when executed by at least one processor, cause a computing device to perform operations that include receiving a user query, and determining, based on the user query, a plurality of keys and corresponding key values. The operations may include determining a word similarity value between each word of the user query and each word of the plurality of keys. The operations may also include determining a user query similarity value for each of the plurality of keys based on the similarity values between each word of the user query and the corresponding words of each of the plurality of keys. Further, the operations may include determining a matching key based on the user similarity value that corresponds to the most similarity. The operations may also include providing a response to the user query based on the matching key and its corresponding key value.

In some embodiments, a non-transitory computer readable medium has instructions stored thereon, where the instructions, when executed by at least one processor, cause a computing device to perform operations that include receiving a user query. The operations may include determining a first word vector based on the user query, and determine a second word vector based on a predefined query. The operations may also include determining a featurization vector based on at least one feature of the user query and the predefined query. The operations may further include concatenating the first word vector, the second word vector, and the featurization vector to generate a concatenation vector. The operations may also include determining a vector value based on the concatenated vector. The operations may further include determining whether the user query matches the predefined query based on the vector value.

In some embodiments, a non-transitory computer readable medium has instructions stored thereon, where the instructions, when executed by at least one processor, cause a computing device to perform operations that include receiving a user query identifying a plurality of words. The operations may include determining, based on the user query, a plurality of keys. The operations may also include determining a first similarity value between at least a portion of the plurality of words and each of the plurality of keys. The operations may also include determining a second similarity value for each of the plurality of keys based on the first similarity values corresponding to each of the plurality of keys. Further, the operations may include determining a first key of the plurality of keys that corresponds to the second similarity value indicating a most similarity. The operations may also include generating a response to the user query, wherein the response identifies the first key.

In some embodiments, a non-transitory computer readable medium has instructions stored thereon, where the instructions, when executed by at least one processor, cause a computing device to perform operations that include determining whether the user query matches a predefined query. Further, if the user query matches the predefined query, the operations may include generating the response identifying a predefined response to the predefined query.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
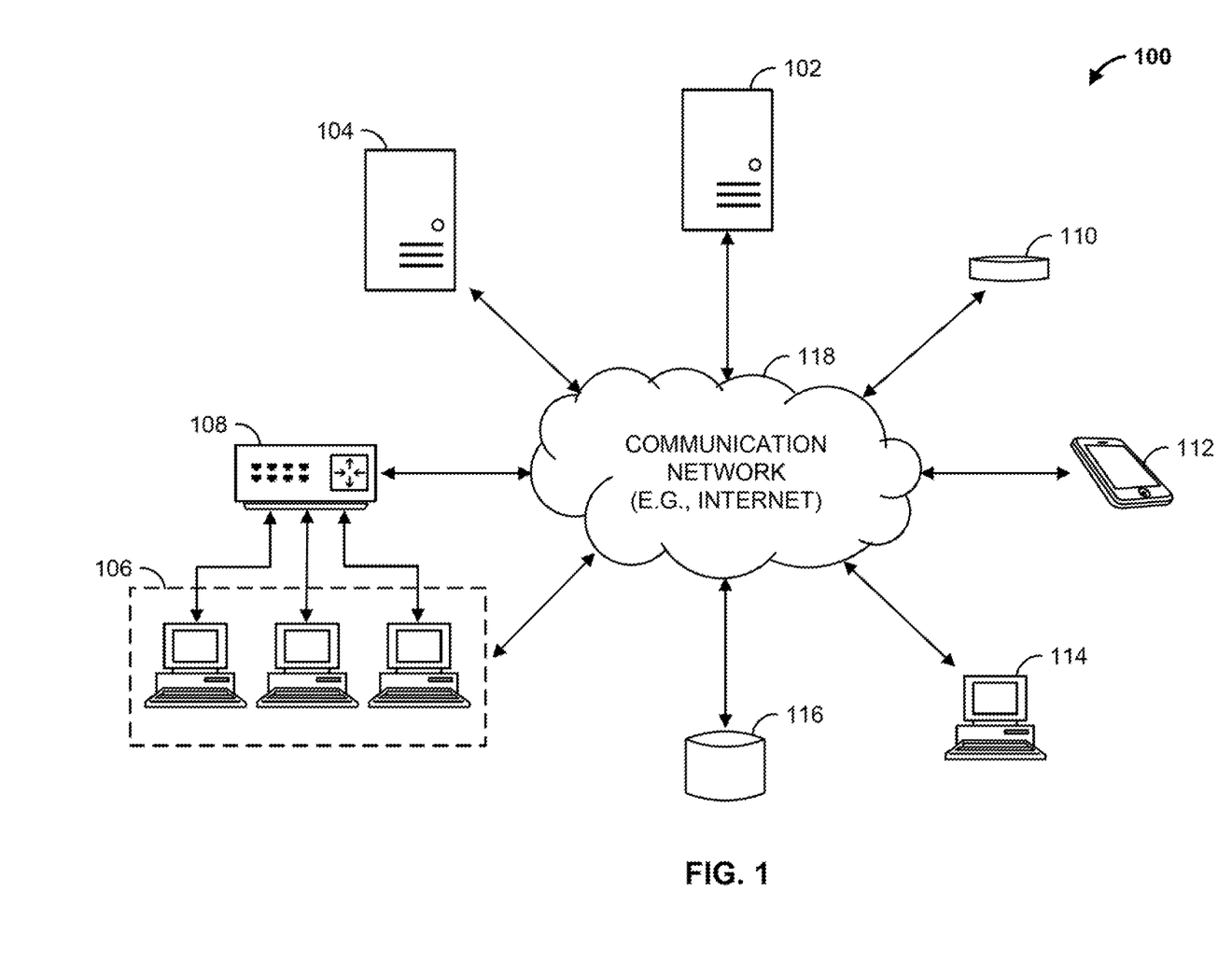
FIG. 1 is a block diagram of an e-commerce voice response determination system in accordance with some embodiments.

Turning to the drawings, FIG. 1 illustrates a block diagram of an e-commerce voice response determination system 100 that includes a voice response determination computing device 102 (e.g., a server, such as an application server), a web hosting device (e.g., a web server) 104, workstation(s) 106, database 116, and multiple customer computing devices 110, 112, 114 operatively coupled over network 118. Voice response determination computing device 102, web hosting device 104, and multiple customer computing devices 110, 112, 114 can each be any suitable computing device that includes any hardware or hardware and software combination for processing and handling information. In addition, each can transmit data to, and receive data from, communication network 118.

For example, voice response determination computing device 102 can be a computer, a workstation, a laptop, a server such as a cloud-based server, or any other suitable device. Each of multiple customer computing devices 110, 112, 114 is operable to receive a verbal query and generate data representing text that corresponds to the verbal query. For example, each of multiple customer computing devices 110, 112, 114 can be a voice assistant device, a digital assistant, a mobile device such as a cellular phone, or any other suitable device.

Each of voice response determination computing device 102, web hosting device 104, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, e-commerce voice response determination system 100 can include any number of customer computing devices 110, 112, 114. Similarly, e-commerce voice representation system 100 can include any number of workstation(s) 106, voice response determination computing devices 102, web servers 104, and databases 116.

Workstation(s) 106 are operably coupled to communication network 118 via router (or switch) 108. For example, workstation(s) 106 can communicate with voice response determination computing device 102 over communication network 118. The workstation(s) 106 can allow for the configuration and/or programming of voice representation computing device 102, such as the controlling and/or programming of one or more processors of voice response determination computing device 102 (described further below with respect to FIG. 2).

Voice response determination computing device 102 and workstation(s) 106 may be operated by a retailer. Customer computing devices 110, 112, 114 may be computing devices operated by customers of a retailer. Voice response determination computing device 102 is operable to communicate with database 116 over communication network 118. For example, voice response determination computing device 102 can store data to, and read data from, database 116. Database 116 can be a remote storage device, such as a cloud-based server, a memory device on another application server, a networked computer, or any other suitable remote storage. Although shown remote to voice response determination computing device 102, in some examples database 116 can be a local storage device, such as a hard drive, a non-volatile memory, or a USB stick.

Communication network 118 can be a WiFi® network, a cellular network such as a 3GPP® network, a Bluetooth® network, a satellite network, or any other suitable network. Communication network 118 can provide access to, for example, the Internet.

Voice response determination computing device 102 can also communicate with first customer computing device 110, second customer computing device 112, and Nth customer computing device 114 over communication network 118. Similarly, first customer computing device 110, second customer computing device 112, and Nth customer computing device 114 are operable to communicate with voice response determination computing device 102 over communication network 118. For example, voice response determination computing device 102 can receive data (e.g., messages) from, and transmit data to, first customer computing device 110, second customer computing device 112, and Nth customer computing device 114.

E-commerce voice response determination system 100 may allow for the parsing of verbal queries, including complex verbal queries, and responses to such verbal queries. For example, one or more of first customer computing device 110, second customer computing device 112, and Nth customer computing device 114 may receive a verbal query, such as a "What is the percent daily value of Vitamin C in an orange," from a customer wanting to place an order from a retailer. Customer computing device 110, 112, 114 may translate the verbal query to data representing the text that corresponds to the verbal query, and may transmit the data to voice response determination computing device 102. Voice response determination computing device 102 may determine a response to the verbal query, and transmit a semantic representation of the response to the customer computing device 110, 112, 114. Customer computing device 110, 112, 114 may then provide (e.g., via a speaker) a conversational reply to the customer based on the received semantic representation of the response.

If the customer decides to purchase an orange, one or more of first customer computing device 110, second customer computing device 112, and Nth customer computing device 114 may receive a verbal query, such as a "add an orange to my cart," from the customer. Customer computing device 110, 112, 114 may translate the verbal query to data representing the text that corresponds to the verbal query, and may transmit the data to voice response determination computing device 102. Voice response determination computing device 102 may generate a semantic representation of the verbal query, and transmit the semantic representation to web server 104. Web server 104 may then add an orange requester's online shopping cart. Voice response determination computing device 102 may then transit to the customer computing device 110, 112, 114 data indicating that the orange was added to the requester's online shopping cart. Customer computing device 110, 112, 114 may then provide a conversational reply that the orange was added to the requester's online shopping cart, such as "an orange was added to your cart."

Figure 2:
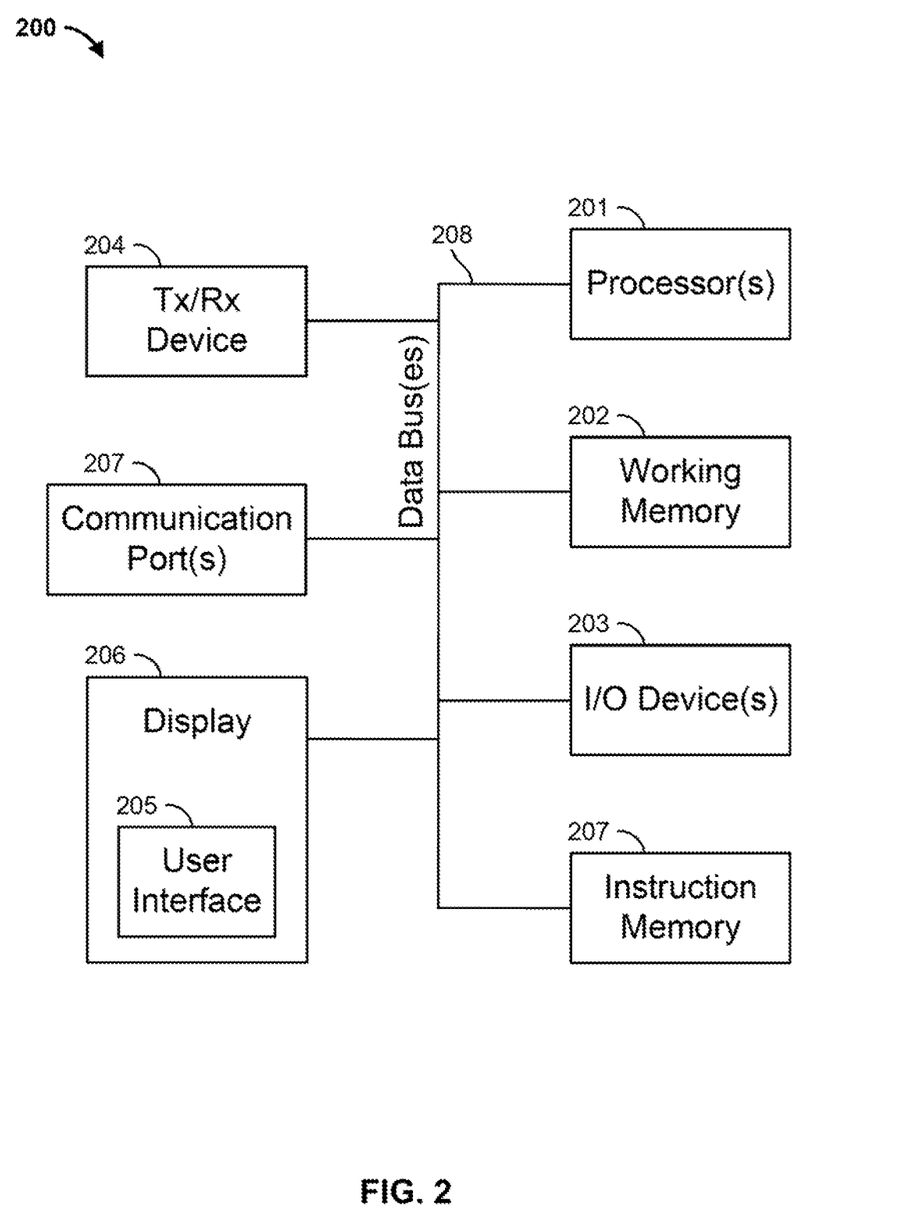
FIG. 2 is a block diagram of the voice response determination computing device of the e-commerce voice response determination system of FIG. 1 in accordance with some embodiments.

FIG. 2 illustrates the voice response determination computing device 102 of FIG. 1. Voice response determination computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of voice response determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as data related to semantic representations of user queries.

Display 206 can display user interface 205. User interfaces 205 can enable user interaction with voice response determination computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 voice response determination computing device 102 will be operating in. Processor(s) 201 is operable to receive data from, or send data to, a network, such as communication network 118 of FIG. 1, via transceiver 204.

Figure 3:
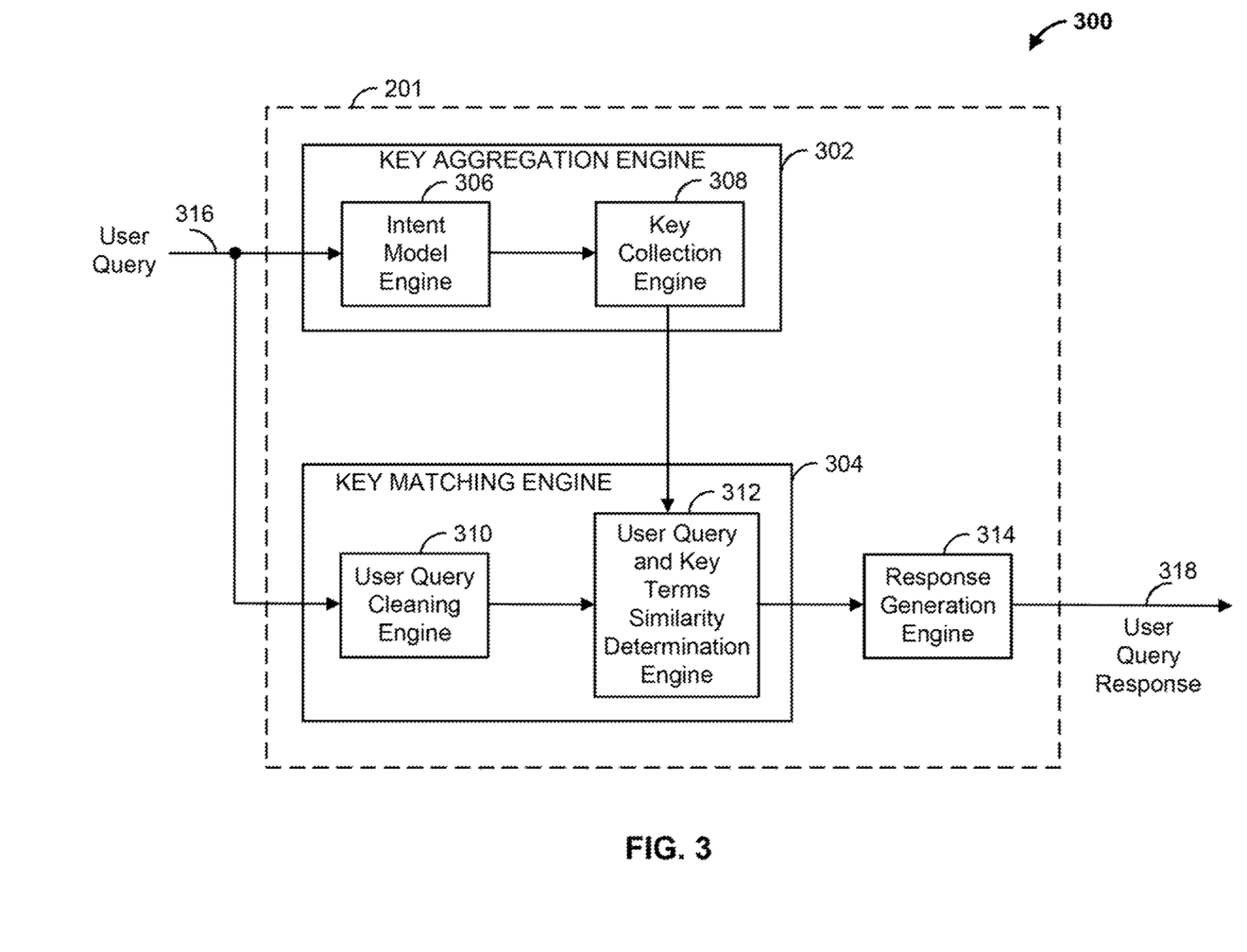
FIG. 3 is a block diagram illustrating an example of a key matching based query response generation engine 300 in accordance with some embodiments.

FIG. 3 is a block diagram illustrating an example of a key matching based query response generation engine 300. As indicated in the figure, voice response determination computing device 102 may include key aggregation engine 302, key matching engine 304, and response generation engine 314. Key aggregation engine 302 may include intent model engine 306 and key collection engine 308. Key matching engine 304 may include user query cleaning engine 310 and user query and key terms similarity determination engine 312. Key matching based query response generation engine 300 may be implemented by the voice response determination computing device 102 of FIG. 1. In some examples, parts or all of each one of these engines may be implemented in software as executable instructions such that, when executed by one or more processors, cause the one or more processors to perform the respective functions described below. For example, one or more of the engines may be implemented by one or more of processor(s) 201 of FIG. 2.

Intent model engine 306 is operable to receive a user query 316 and output a label based on the received user query 316. User query 316 may be data representing a verbal query that has been translated to text from a voice assistant device, for example. For example, for a user query 316 of "Percent daily value of Vitamin C in an apple?," intent model engine 306 may output a label of "Product Info: Nutrition." Other such labels may include, for example, "Product Info: Binary," "Product Info: Count," and "Product Info: Measurement." Intent model engine 306 may determine the label for the received user query 316 based on the implementation of a recurrent neural network (RNN) such as, for example, a long-short term memory (LSTM) RNN architecture or a bidirectional long-short term memory (BiLSTM) RNN architecture. Based on machine learning, intent model engine 306 can learn to predict a label for a given theory.

Key collection engine 308 is operable to determine keys (e.g., product related information such as nutritional product descriptions), and any associated key values (e.g., numerical values corresponding to the product related information), that correspond to the label determined by intent model engine 306. Keys that correspond to the label may include all keys that fall under the category of the label. For example, for the label "Product Info: Nutrition," key collection engine 308 may determine nutrition keys such as: "vitamin_c_daily_value," "vitamin_c_raw_value," "iron_daily_value," . . . "number_of_calories." Associated key values may include, for each of these key examples, a nutritional value (e.g., "10 milli-grams" may be a key value for the key "vitamin_c_daily_value," and "100 calories" may be a key value for the key "number_of_calories"). A database, such as database 116 of FIG. 1, may store all labels and corresponding key and key values. For example, database 116 may store multiple labels where each label is linked to a plurality of corresponding keys, where each key may include an associated key value. In this example, key collection engine 308 is operable to obtain from database 116 the corresponding keys, and any associated key values, for a given label.

User query cleaning engine 310 is operable to receive user query 316 and parse the query to obtain a clean version of the query that does not include unimportant words (e.g., "stop words"). For example, for the query "Percent daily value of Vitamin C in an apple?," user query cleaning engine 310 may parse out the words "of," "in," "and," and the question mark ("?") to obtain clean version "Percent daily value Vitamin C apple." In some examples, a database, such as database 116 of FIG. 1, includes a list of unimportant words. In these examples, user query cleaning engine 310 is operable to query the database to determine if each word of a user query is an unimportant word. Based on the determination, user query cleaning engine 310 removes the unimportant word from the query when generating the clean version. For example, if a word of a user query is not an unimportant word, user query cleaning engine 310 adds the word to a clean version. If the word is an unimportant word, user query cleaning engine 310 does not add the word to the clean version. In some examples, user query cleaning engine 310 adjusts uppercase characters within a user query to lowercase. For example, in the above noted example, user query cleaning engine may convert the uppercase 'P,' 'V,' and 'C' to lower case, resulting in clean user query version "percent daily value vitamin c apple."

User query and key terms similarity determination engine 312 is operable to obtain the determined keys and corresponding key values from key collection engine 308. User query and key terms similarity determination engine 312 is also operable to obtain the clean version of the query from user query cleaning engine 310, and determine the key that matches the closest (e.g., strongest) with the clean version.

For example, user query and key terms similarity determination engine 312 may parse each key into corresponding words. For example, user query and key terms similarity determination engine 312 may parse key "vitamin_c_daily_value" into the words "vitamin," "c," "daily," and "value." User query and key terms similarity determination engine 312 may similarly parse the clean version of the query into its corresponding words. Then, for each word of the clean version of the user query, user query and key terms similarity determination engine 312 may determine how closely the word matches with each word of the parsed key.

In some examples, user query and key terms similarity determination engine 312 may employ an unsupervised learning algorithm to determine how closely the user query words match with each word of the parsed key. For example, user query and key terms similarity determination engine 312 may determine the GloVe vector, as is known in the art, for each word of the clean version of the user query, and for each word of the parsed key. User query and key terms similarity determination engine 312 may either locally store the GloVe vectors, or may obtain them from a storage location, such as database 116 of FIG. 1. User query and key terms similarity determination engine 312 may then compare the GloVe vector for each word of the clean version of the user query to the GloVe vector of each word of the parsed key to determine a closest match. For example, user query and key terms similarity determination engine 312 may determine a difference between the GloVe vector for a word of the clean version of the user query and the GloVe vector for each word of the parsed key.

As an illustration, user query and key terms similarity determination engine 312 may subtract the GloVe vector for the word "daily" in clean query version "percent daily value vitamin c apple" from the GloVe vector for the word "vitamin" in key "vitamin_c_daily_value." User query and key terms similarity determination engine 312 may also subtract the GloVe vector for the word "daily" from each of the GloVe vectors for the words "c," "daily," and "value."

User query and key terms similarity determination engine 312 may then determine, for each word of the clean query version, the closest matching word in the parsed key based on the GloVe vector comparisons. For example, the closest matching word in the parsed key may be the one with the smallest Euclidean distance between GloVe vectors.

User query and key terms similarity determination engine 312 may then determine the closest matching key to the clean query version. For example, user query and key terms similarity determination engine 312 may combine the individual results for individual words of the GloVe vector comparisons to obtain a final result (e.g., score). In some examples, the squares of the smallest GloVe vector comparison for each word of the clean user query are determined. The results may then be added together to determine an overall value (e.g., score) for the clean user query. For example, user query and key terms similarity engine 312 may average the smallest GloVe distances over each word in the clean query to obtain a final score for a key-user query vector pair.

In some examples, if the overall value is below a predefined threshold, then the key, and any associated key value, is used for a response to the user query 316. In some examples, an overall value for each key determined by key collection engine 308 is determined. The key corresponding to the lowest overall value determines the response to the user query 316. For example, if it is determined that, for the clean user query "percent daily value vitamin c apple," the key "vitamin_c_daily_value" is below a threshold, then the key and any associated key value (e.g., 10 milli-grams) determines the response to the user query 316.

It is to be appreciated that, instead of the lowest overall value pertaining to the closest match, a highest overall value may pertain to the closest match (for example, this may depend on how an algorithm is designed). As such, in this case, the key corresponding to the highest overall value is used for the response. The closest matching key, and any associated key value, are provided to response generation engine 314.

Response generation engine 314 obtains from user query and key terms similarity determination engine 312 the closest matching key and any associated key value to generate a response to the user query 316. The response may include, for example, a predefined response corresponding to the key. For example, if the obtained key is "vitamin_c_daily_value" along with a key value of "10 milli-grams," response generation engine 314 may provide a user query response 318 of "there is 10 milli-grams of vitamin c." Part of the response may be pre-defined (e.g., "there is" and "of vitamin c"), and part of the response may be based on the key and/or key value (e.g., 10 milli-grams). Pre-defined responses may be stored in and obtained from a storage location, such as database 116 in FIG. 1.

Figure 4:
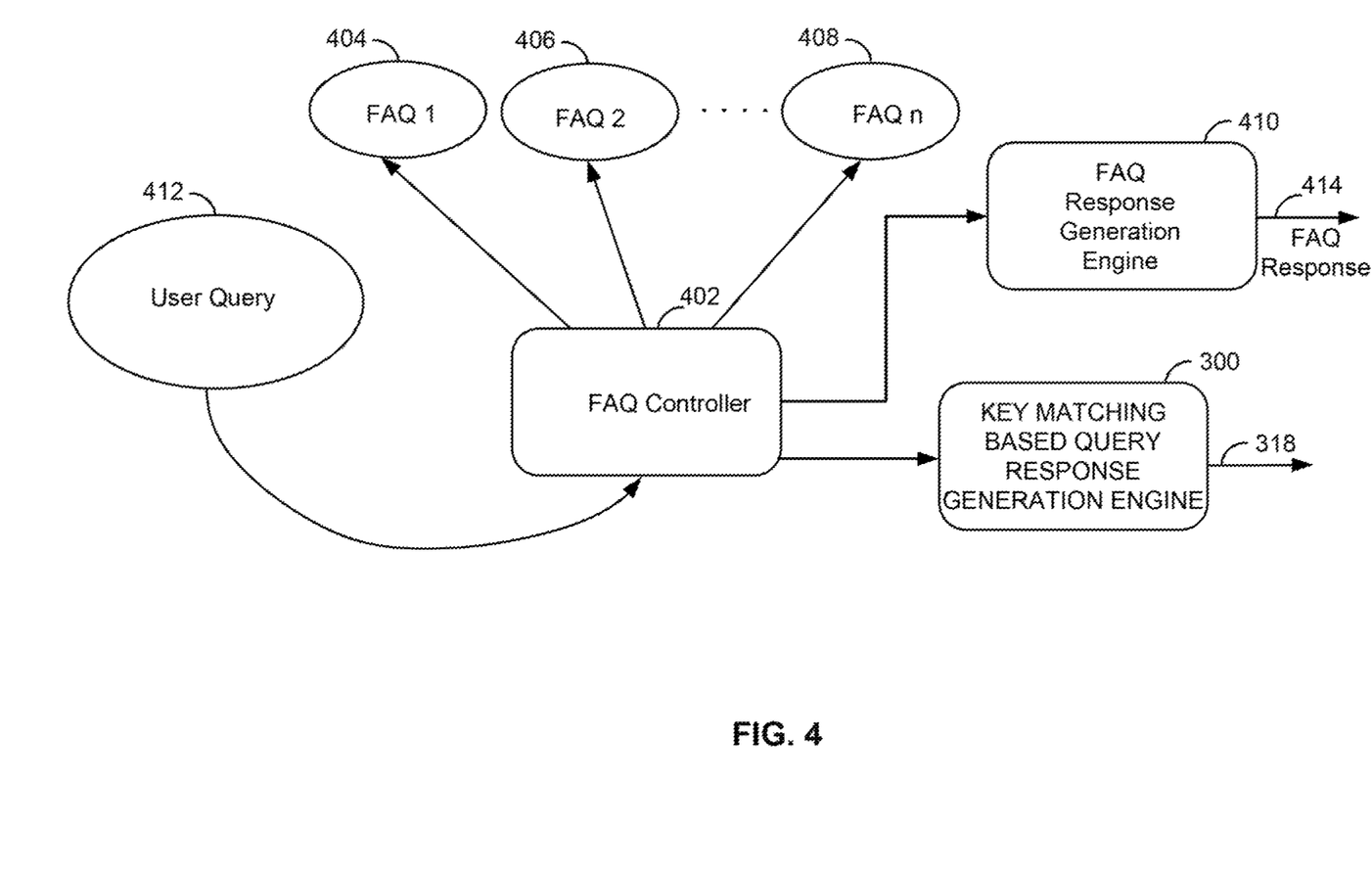
FIG. 4 is a block diagram illustrating an example of a frequently asked questions (FAQ) controller in accordance with some embodiments.

FIG. 4 is a block diagram illustrating an example of a frequently asked questions (FAQ) controller 402. FAQ controller 402 may be implemented by the voice response determination computing device 102 of FIG. 1. For example, FAQ controller may be implemented by one or more of processor(s) 201 of FIG. 2.

Figure 8:
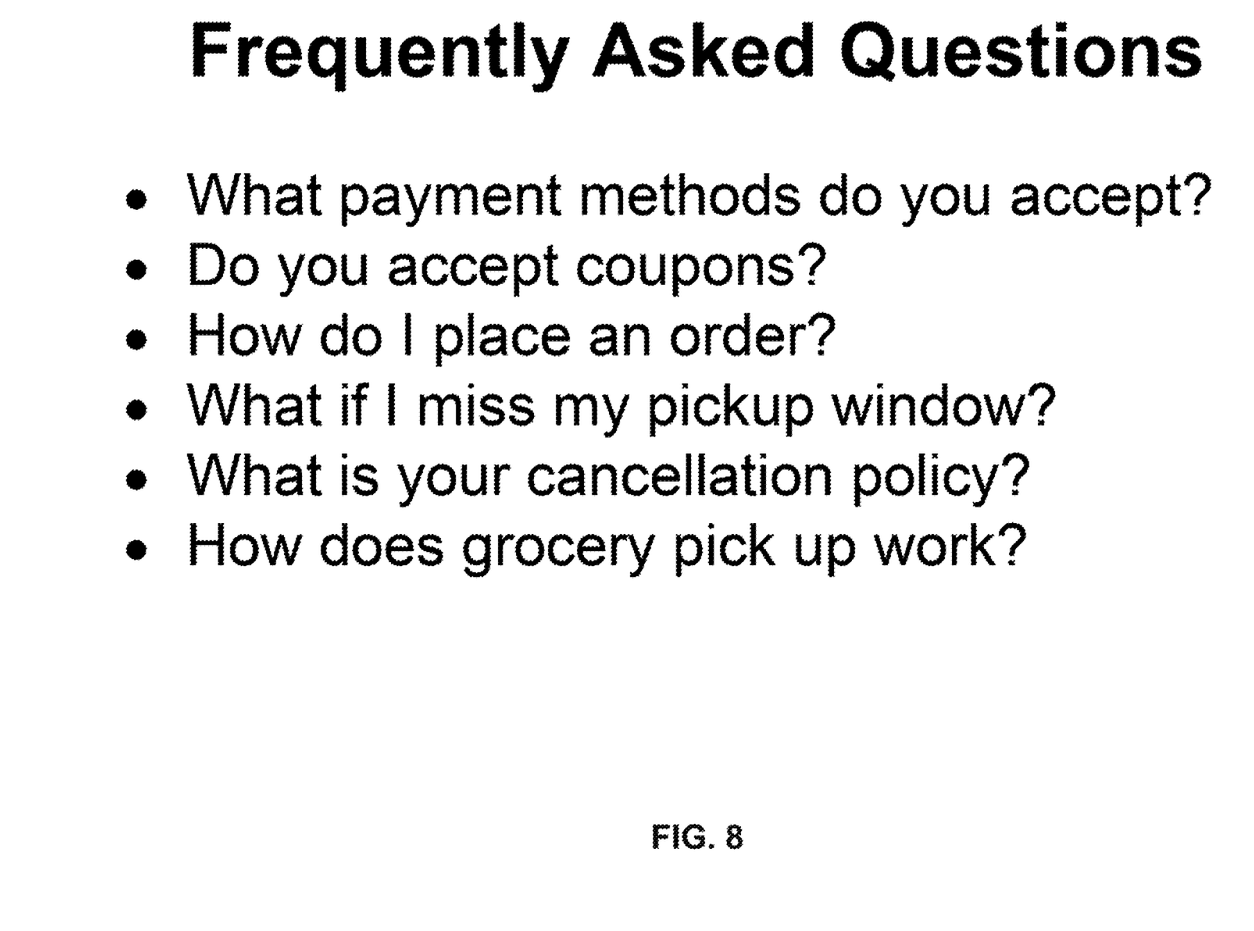
FIG. 8 is a diagram illustrating example frequently asked questions (FAQs).

FAQ controller 402 is operable to obtain user query 412, and determine if it matches to a FAQ 404, 406, 408. FAQ 404, 406, 408 may correspond to the text of predefined queries, such as frequently asked questions. FIG. 8 illustrates example FAQs. In some examples, FAQ 404, 406, 408 may be stored and accessible in a database, such as database 116 of FIG. 1, as a list of predefined queries. If the user query 412 matches to a FAQ, FAQ controller 402 provides data corresponding to a response to the corresponding question to FAQ response generation engine 410. FAQ response generation engine 410 is operable to provide a FAQ response 414 to the user query 412, which may be a predefined response to the particular FAQ 404, 406, 408. For example, the predefined responses may be stored and accessible in a database, such as database 116 of FIG. 1, along with the FAQ 404, 406, 408.

Otherwise, if the user query 412 does not match to a FAQ, FAQ controller 402 provides the user query 412 to key matching based query response generation engine 300, which was described above with respect to FIG. 3. For example, the user query 412 may be provided to intent model engine 306 to determine a user intent. In some examples, only if the intent is determined to be one of a set of predetermined intents does key matching based query response generation engine 300 continue processing to determine a key. As an example, only if the determined intent is one of the set of predefined intents of "Product Info: Nutrition," "Product Info: Count," "Product Info: Binary," or "Product Info: Measurement," will key matching based query response generation engine 300 continue with processing the user query to match a key. Otherwise, key matching based query response generation engine 300 may provide a response (e.g., if the intent is determined to be "Checkout," then a checkout will be performed and the user will be informed.) FAQ controller 402 may determine user query 412 matches to a FAQ 404, 406, 408 if, for example, the words of the user query 412 closely match those in the corresponding FAQ 404, 406, 408. In some examples, FAQ controller 402 determines whether user query 412 matches a FAQ 404, 406, 408 by comparing GloVe vectors for words of the user query 412 to words of the FAQ 404, 406, 408, similar to the description below for FIG. 5 where two queries are given to the FAQ Controller 402 at a time, and the FAQ Controller determines if the two queries are similar In some examples, FAQ controller 402 determines whether user query 412 matches a FAQ 404, 406, 408 as described below with respect to FIG. 5.

Figure 5:
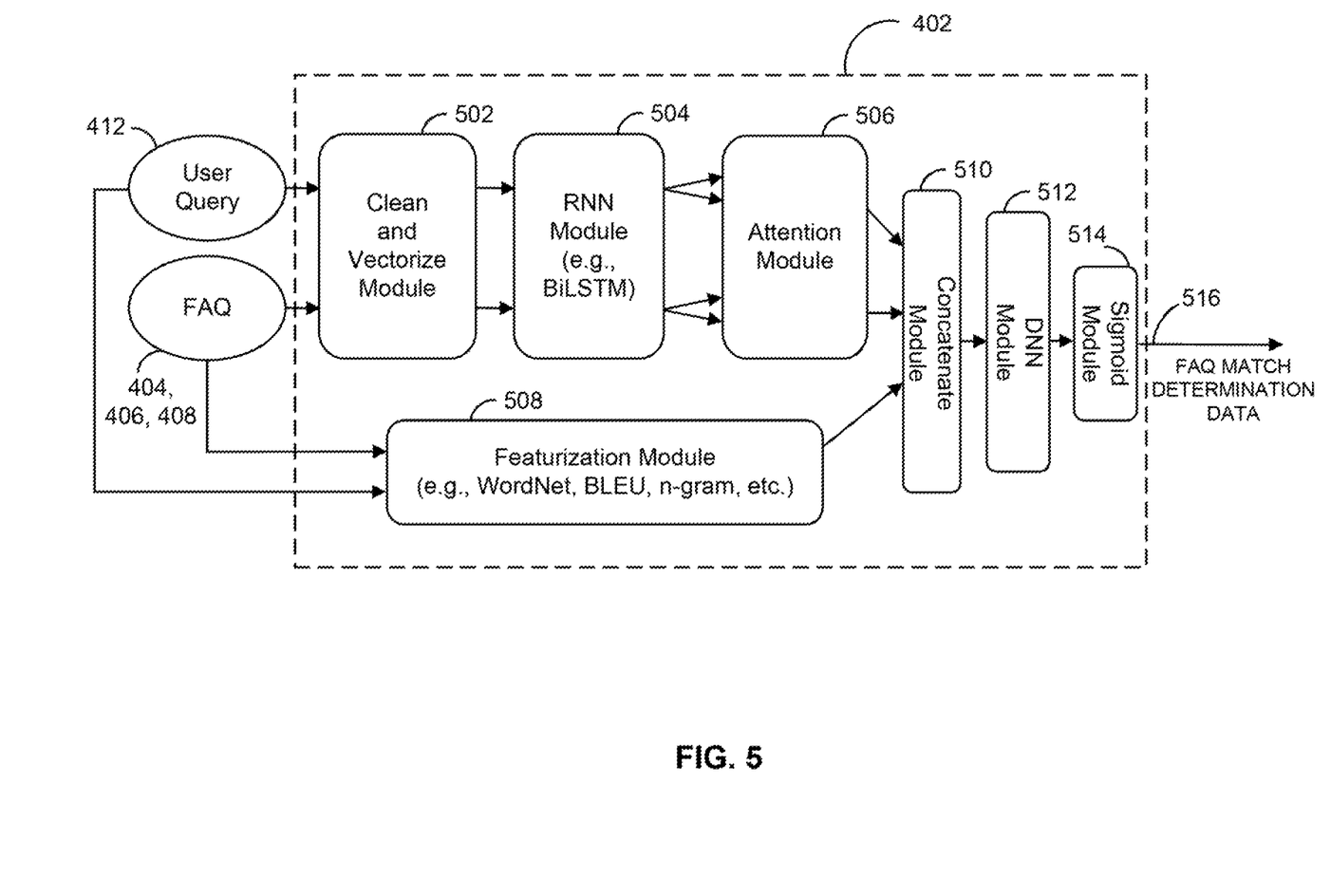
FIG. 5 is a block diagram illustrating a more detailed view of the FAQ controller of FIG. 4.

FIG. 5 illustrates a more detailed view of the FAQ controller 402 of FIG. 4. As illustrated in the figure, FAQ controller 402 includes clean and vectorize module 502, recurrent neural network (RNN) module 504, attention module 506, featurization module 508, concatenate module 510, dense neural network (DNN) module 512, and sigmoid module 514. In some examples, parts or all of each one of these modules may be implemented in software as executable instructions such that, when executed by one or more processors, cause the one or more processors to perform the respective functions described below.

Clean and vectorize module 502 is operable to receive user query 412 and a FAQ 404, 406, 408. Clean and vectorize module 502 may parse each of the user query 412 and FAQ 404, 406, 408 to obtain clean versions of each. The clean versions of the user query 412 and FAQ 404, 406, 408 do not include unimportant words (e.g., "stop words"). Clean and vectorize module 502 may "vectorize" user query 412 by replacing each word of clean version of user query 412 with a vector, such as a GloVe vector. For example, a first vector v[0] may include data representing the first word of the clean version of the user query 414, a second vector v[1] may include data representing the second word of the clean version of the user query 414, and so on. Similarly, clean and vectorize module 502 may "vectorize" the clean version of FAQ 404, 406, 408.

RNN module 504 obtains the clean and vectorized versions of user query 414 and of FAQ 404, 406, 408 from clean and vectorize module 502. RNN module 504 processes each vector in the cleaned and vectorized version of user query 414 in conjunction with the other vectors in the query to produce a new context-dependent vector. RNN module 504 may produce a similar set of context-dependent vectors for FAQ 404, 406, 408. RNN module 504 then provides the transformed vectors to attention module 506.

Attention module 506 obtains the context-dependent vectors for each of the user query and FAQ from RNN module 504. Attention module 506 may collapse all of the context-dependent vectors from the user query into a single vector by performing a weighted sum of those context-dependent vectors. Similarly, attention module 506 may collapse all of the context-dependent vectors from each of the FAQ 404, 406, 408 into single vectors, respectively, by performing a weighted sum of those respective context-dependent vectors. Attention module 506 then provides each of the collapsed vectors to the concatenate module 510.

Featurization module 508 is operable to obtain user query 412 and FAQ 404, 406, 408, and determine a feature value based on their features. For example, featurization module 508 may determine a feature value based on how many words overlap between user query 412 and FAQ 404, 406, 408. Featurization module 508 provides a feature vector with feature values based on feature determinations.

Concatenate module 510 obtains the collapsed vectors from attention module 506, as well as the feature vector from featurization module 508, and appends them together to generate a concatenated vector. For example, collapsed vectors qcv[10] and fcv[20], and feature vector fv[40], may be appended to form concatenated vector cmv[70].

DNN module 512 obtains the concatenated vector from concatenate module 510 and processes it via a deep neural network, a series of matrix multiplications and non-linear transformations, to determine a concatenation value. The matrices used in the deep neural network may be learned from a hand-curated dataset of input-output pairs, such that the deep neural network produces accurate values for data points in the dataset.

Sigmoid module 514 obtains the concatenation value from DNN module 512 to generate FAQ match determination data 516 based on a sigmoid function. FAQ match determination data 516 may be, for example, data representing a number from 0 to 1, inclusive. The sigmoid function may be a predefined sigmoid function.

FAQ controller 402 may determine whether the user query 412 matches a FAQ 404, 406, 408 based on the FAQ match determination data 516. For example, if the FAQ match determination data 516 is beyond (e.g., above, below) a threshold, FAQ controller 402 may determine that the user query 412 matches the FAQ 404, 406, 408. If the FAQ match determination data 516 is not beyond the threshold, FAQ controller 402 may determine that the user query 412 does not match the FAQ 404, 406, 408. In some examples, if the FAQ controller 402 determines that the user query 412 does not match any of FAQs 404, 406, 408, FAQ controller 403 may provide the user query 412 to key matching based query response generation engine 300 as described above with respect to FIG. 4.

Figure 6:
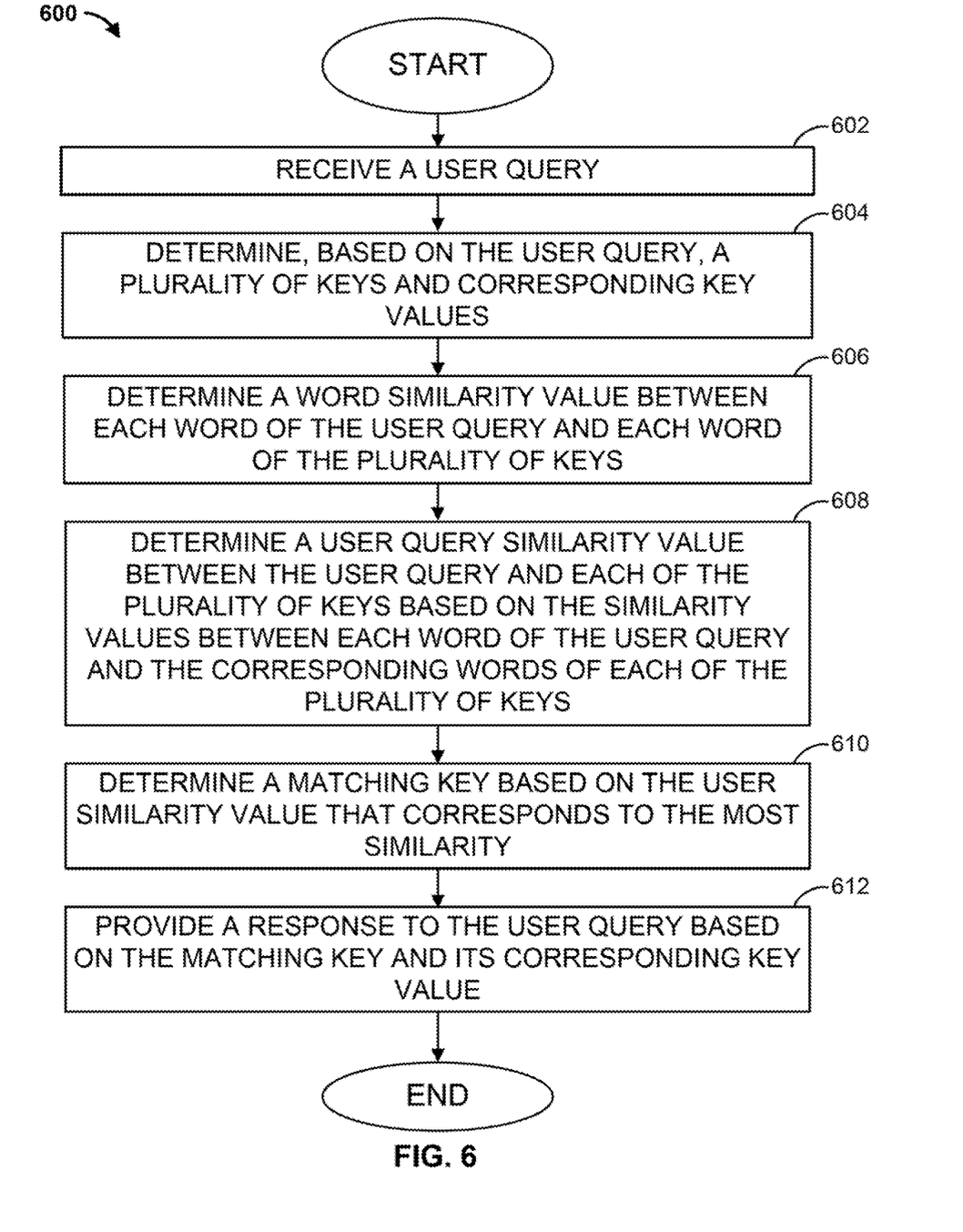
FIG. 6 is a flowchart of an example method that can be carried out by the e-commerce voice response determination system of FIG. 1 in accordance with some embodiments.

FIG. 6 is a flowchart of an example method 600 that can be carried out by, for example, the e-commerce voice response determination system of FIG. 1. At step 602, a user query is received. The user query may be received from a voice assistant device over a network, for example. The user query may be data representing a voice query from a user of the voice assistant device. At step 604, a plurality of keys and corresponding key values are determined based on the user query. For example, the plurality of keys and corresponding key values may be associated with an intent of the user query. At step 606, a word similarity value between each word of the user query and each word of the plurality of keys is determined. At step 608, a user query similarity value for each of the plurality of keys is determined based on the similarity values between each word of the user query and the corresponding words of each of the plurality of keys.

Proceeding to step 610, a matching key is determined that corresponds to the key that is most similar to the user query. The matching key is determined to be the key that is most similar to the user query based on the calculated user similarity values. At step 612, a response to the user query is provided based on the matching key and its corresponding key value. For example, data representing a pre-defined response that includes the matching key's corresponding key value may be transmitted to the voice assistant device over the network for playback on the voice assistant device.

Figure 7:
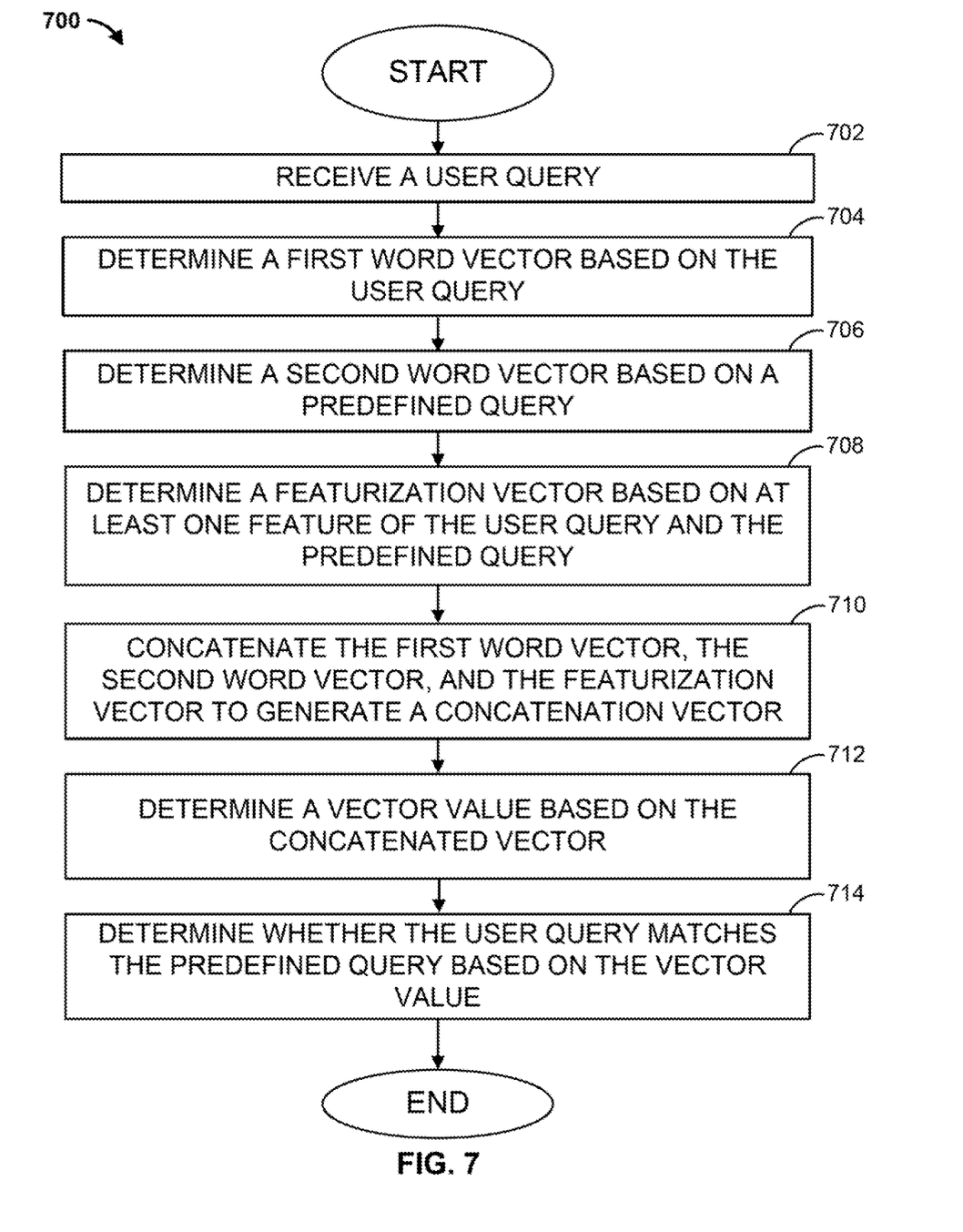
FIG. 7 is a flowchart of another example method that can be carried out by the e-commerce voice response determination system of FIG. 1 in accordance with some embodiments.

FIG. 7 is a flowchart of another example method 700 that can be carried out by, for example, the e-commerce voice response determination system of FIG. 1. At step 702, a user query is received. The user query may be received from a voice assistant device over a network, for example. The user query may be data representing a voice query from a user of the voice assistant device. At step 704, a first word vector is determined based on the user query. For example, the first word vector may be determined by FAQ controller 402 as described above with respect to FIG. 5. At step 706, a second word vector is determined based on a predefined query, such as a frequently asked question, as described above with respect to FIG. 5. For example, the second word vector may be data representing a frequently asked question. At step 708, a featurization vector is determined based on at least one feature of the user query and the predefined query. For example, the feature may be a number of common words between the user query and the predefined query.

Proceeding to step 710, the first word vector, the second word vector, and the featurization vector are concatenated to generate a concatenation vector. At step 712, a vector value is determined based on the concatenated vector. For example, the vector value may be based on a dense neural network analysis of the concatenated vector. At step 714, a determination is made as to whether the user query matches the predefined query based on the vector value. For example, if the sigmoid function of the vector value is beyond a predefined threshold, a determination is made that the user query matches the predefined query.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a computing device configured to:
  receive a user query identifying a plurality of words;
  determine, based on the user query, a plurality of keys;
  determine a first similarity value between at least a portion of the plurality of words and each of the plurality of keys;
  determine a second similarity value for each of the plurality of keys based on the first similarity values corresponding to each of the plurality of keys;
  determine a first key of the plurality of keys that corresponds to the second similarity value indicating a most similarity;
  generate a first vector based on the plurality of words of the user query;
  generate a second vector based on the user query and a predefined query;
  generate a first value based on the first vector and the second vector; and
  generate a response to the user query based on the first value and the second similarity value indicating the most similarity, wherein the response identifies at least one of the first key and a predefined response to the predefined query.

2. The system of claim 1, wherein the computing device is configured to:
 determine at least one corresponding key value for each of the plurality of keys; and
 generate the response identifying the corresponding key value to the first key.

3. The system of claim 1, wherein the computing device is configured to:
apply a recurrent neural network to the user query to determine a label; and
determine the plurality of keys based on the label.

4. The system of claim 1, wherein the computing device is configured to:
apply an unsupervised learning algorithm to each of the at least portion of the plurality of words and each of the plurality of keys to determine corresponding vectors;
compare the vector for each of the at least portion of the plurality of words with the vector for each of the plurality of keys; and
determine the first similarity values based on the comparisons.

5. The system of claim 1, wherein the computing device is configured to:
compare the plurality of words of the user query to a plurality of unimportant words;
determine that at least one word of the plurality of words of the user query matches at least one word of the plurality of unimportant words; and
remove the at least one word of the plurality of words from the user query, wherein the at least portion of the plurality of words does not include the at least one removed word.

6. The system of claim 1, wherein the computing device is configured to:
determine whether the user query matches theft predefined query; and
if the user query matches the predefined query, generate the response identifying the predefined response to the predefined query.

7. The system of claim 6, wherein determining whether the user query matches the predefined query comprises determining a number of words that overlap between the user query and the predefined query.

8. The system of claim 7, wherein determining whether the user query matches the predefined query comprises:
generating the second vector based on the number of words that overlap between the user query and the predefined query; and
applying a deep neural network to the first vector and the second vector to generate the first value.

9. The system of claim 1, wherein the computing device is a first computing device, wherein the system comprises a second computing device, and wherein the second computing device is configured to:
receive a verbal query from a user;
translate the verbal query to the user query identifying the plurality of phrases; and
transmit the user query to the first computing device.

10. A method comprising:
receiving a user query identifying a plurality of words;
determining, based on the user query, a plurality of keys;
determining a first similarity value between at least a portion of the plurality of words and each of the plurality of keys;
determining a second similarity value for each of the plurality of keys based on the first similarity values corresponding to each of the plurality of keys;
determining a first key of the plurality of keys that corresponds to the second similarity value indicating a most similarity;
generating a first vector based on the plurality of words of the user query;
generating a second vector based on the user query and the predefined query;
generating a first value based on the first vector and the second vector; and
generating a response to the user query based on the first value and the second similarity value indicating the most similarity, wherein the response identifies at least one of the first key and a predefined response to the predefined query.

11. The method of claim 10 further comprising:
determining at least one corresponding key value for each of the plurality of keys; and
generating the response identifying the corresponding key value to the first key.

12. The method of claim 10 further comprising:
applying a recurrent neural network to the user query to determine a label; and
determining the plurality of keys based on the label.

13. The method of claim 10 further comprising:
applying an unsupervised learning algorithm to each of the at least portion of the plurality of words and each of the plurality of keys to determine corresponding vectors;
comparing the vector for each of the at least portion of the plurality of words with the vector for each of the plurality of keys; and
determining the first similarity values based on the comparisons.

14. The method of claim 10 further comprising:
comparing the plurality of words of the user query to a plurality of unimportant words;
determining that at least one word of the plurality of words of the user query matches at least one word of the plurality of unimportant words; and
removing the at least one word of the plurality of words from the user query, wherein the at least portion of the plurality of words does not include the at least one removed word.

15. The method of claim 10 further comprising:
determining whether the user query matches the predefined query; and
if the user query matches the predefined query, generating the response identifying the predefined response to the predefined query.

16. A non-transitory computer readable medium having instructions stored thereon, wherein the instructions, when executed by at least one processor, cause a device to perform operations comprising:
receiving a user query identifying a plurality of words;
determining, based on the user query, a plurality of keys;
determining a first similarity value between at least a portion of the plurality of words and each of the plurality of keys;
determining a second similarity value for each of the plurality of keys based on the first similarity values corresponding to each of the plurality of keys;
determining a first key of the plurality of keys that corresponds to the second similarity value indicating a most similarity;
generating a first vector based on the plurality of words of the user query;
generating a second vector based on the user query and the predefined query;
generating a first value based on the first vector and the second vector; and
generating a response to the user query based on the first value and the second similarity value indicating the most similarity, wherein the response identifies at least one of the first key and a predefined response to the predefined query.

17. The non-transitory computer readable medium of claim 16 further comprising instructions stored thereon that, when executed by at least one processor, further cause the device to perform operations comprising:
determining at least one corresponding key value for each of the plurality of keys; and
generating the response identifying the corresponding key value to the first key.

18. The non-transitory computer readable medium of claim 16 further comprising instructions stored thereon that, when executed by at least one processor, further cause the device to perform operations comprising:
applying a recurrent neural network to the user query to determine a label; and
determining the plurality of keys based on the label.

19. The non-transitory computer readable medium of claim 16 further comprising instructions stored thereon that, when executed by at least one processor, further cause the device to perform operations comprising:
applying an unsupervised learning algorithm to each of the at least portion of the plurality of words and each of the plurality of keys to determine corresponding vectors;
comparing the vector for each of the at least portion of the plurality of words with the vector for each of the plurality of keys; and
determining the first similarity values based on the comparisons.

20. The non-transitory computer readable medium of claim 16 further comprising instructions stored thereon that, when executed by at least one processor, further cause the device to perform operations comprising:
determining whether the user query matches theft predefined query; and
if the user query matches the predefined query, generating the response identifying the predefined response to the predefined query.

* * * * *